United States Patent
Li et al.

(10) Patent No.: US 10,073,988 B2
(45) Date of Patent: Sep. 11, 2018

(54) CHIPSET AND HOST CONTROLLER WITH CAPABILITY OF DISK ENCRYPTION

(71) Applicant: VIA Alliance Semiconductor Co., Ltd., Shanghai (CN)

(72) Inventors: Kai Li, Beijing (CN); Gangru Xue, Beijing (CN); Yun Shen, Beijing (CN); Hui Li, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 124 days.

(21) Appl. No.: 15/095,368

(22) Filed: Apr. 11, 2016

(65) Prior Publication Data

US 2017/0124337 A1 May 4, 2017

(30) Foreign Application Priority Data

Nov. 2, 2015 (CN) .......................... 2015 1 0734166

(51) Int. Cl.
*G06F 21/78* (2013.01)
*G06F 21/62* (2013.01)
(Continued)

(52) U.S. Cl.
CPC .............. *G06F 21/78* (2013.01); *G06F 3/064* (2013.01); *G06F 3/0623* (2013.01);
(Continued)

(58) Field of Classification Search
CPC ........ G06F 21/602; G06F 21/62; G06F 21/79; G06F 21/80; G06F 3/0623; G06F 3/064; G06F 3/0673
See application file for complete search history.

(56) References Cited

U.S. PATENT DOCUMENTS 8,364,975 B2    1/2013  Kumar et al.
8,526,615 B2 *  9/2013  Fujimoto .............. G06F 21/606
                                                    380/255
(Continued)

FOREIGN PATENT DOCUMENTS

CN    101082883 A    12/2007
CN    101288065 A    10/2008
(Continued)

OTHER PUBLICATIONS

Chinese language office action dated Apr. 19, 2017, issued in application No. TW 104139576.
(Continued)

*Primary Examiner* — Robert B Leung
(74) *Attorney, Agent, or Firm* — McClure, Qualey & Rodack, LLP

(57) ABSTRACT

A chipset and a host controller, including a storage host controller for a storage device and an encryption and decryption engine that is implemented by hardware. The storage host controller analyzes a write command to obtain write command information, and provides the write command information and write data to the encryption and decryption engine. The encryption and decryption engine combines a data drive key with the write command information to encrypt the write data and provides the encrypted write data to the storage host controller to be written into a storage device via a communication port.

18 Claims, 10 Drawing Sheets

(51) Int. Cl.
*G06F 3/06* (2006.01)
*G06F 21/60* (2013.01)

(52) U.S. Cl.
CPC .......... *G06F 3/0673* (2013.01); *G06F 21/602* (2013.01); *G06F 21/62* (2013.01)

(56) References Cited

U.S. PATENT DOCUMENTS

| | | | |
|---|---|---|---|
| 8,886,956 B2 | 11/2014 | Lee et al. | |
| 9,665,501 B1* | 5/2017 | Obukhov | G06F 12/1408 |
| 2006/0218190 A1 | 9/2006 | Frost et al. | |
| 2006/0218412 A1* | 9/2006 | Hars | G06F 21/602 |
| | | | 713/193 |
| 2007/0088959 A1* | 4/2007 | Cox | G06F 21/72 |
| | | | 713/189 |
| 2008/0260159 A1* | 10/2008 | Osaki | G06F 21/80 |
| | | | 380/277 |
| 2010/0185808 A1* | 7/2010 | Yu | G06F 13/1684 |
| | | | 711/103 |
| 2010/0229005 A1* | 9/2010 | Herman | G06F 12/1408 |
| | | | 713/193 |
| 2010/0303240 A1* | 12/2010 | Beachem | G06F 21/57 |
| | | | 380/277 |
| 2011/0072276 A1* | 3/2011 | Lee | G06F 21/80 |
| | | | 713/189 |
| 2013/0227301 A1* | 8/2013 | Sarcone | G06F 21/85 |
| | | | 713/189 |
| 2013/0305061 A1* | 11/2013 | Yuan | G06F 21/602 |
| | | | 713/193 |
| 2015/0039909 A1* | 2/2015 | Tseng | G06F 12/1408 |
| | | | 713/193 |
| 2015/0058639 A1* | 2/2015 | Hasegawa | G06F 21/78 |
| | | | 713/190 |

FOREIGN PATENT DOCUMENTS

| | | |
|---|---|---|
| CN | 101251879 B | 10/2010 |
| TW | 201118639 A1 | 6/2011 |

OTHER PUBLICATIONS

Office Action dated Aug. 5, 2016 in Taiwan application (No. 104140050).

Chinese language office action dated Oct. 10, 2017, issued in application No. CN 201510734166.0.

* cited by examiner

US 10,073,988 B2

CHIPSET AND HOST CONTROLLER WITH CAPABILITY OF DISK ENCRYPTION

CROSS REFERENCE TO RELATED APPLICATIONS

This application claims priority of China Patent Application No. 201510734166.0, filed on Nov. 2, 2015, the entirety of which is incorporated by reference herein.

BACKGROUND OF THE INVENTION

Field of the Invention

The present invention relates to chipsets with built-in encryption and decryption hardware for data drive.

Description of the Related Art

For removable storage devices (e.g. a data drive), data encryption and decryption is a common method for security protection of the user's data. The existing technique for data drive encryption is usually performed within a system storage device by software (e.g. Bitlock or Truecrypt for Microsoft), or performed within a storage device by the controller of the storage device. According to one conventional data drive encryption technique, the encryption keys in the system storage device (or those transmitted in the data bus connected to the storage device) may be exposed. Thus, data security is threatened. How to protect the encryption keys and increase the difficulty of encryption cracking and so on is important in this field.

BRIEF SUMMARY OF THE INVENTION

A chipset in accordance with an exemplary embodiment of the disclosure has a storage host controller and an encryption and decryption engine. The storage host controller controls the communication between a connection port and a storage device. The encryption and decryption engine is hardware coupled to the storage host controller. The storage host controller receives and analyzes a write command to obtain write command information and transmits write data and the write command information to the encryption and decryption engine. The encryption and decryption engine combines a data drive key with the write command information to encrypt the write data and transmits the encrypted write data to the storage host controller to be written into the storage device via the connection port.

In an exemplary embodiment, the storage host controller further receives and analyzes a read command to obtain read command information and transmits encrypted read data retrieved from the storage device and the read command information to the encryption and decryption engine. The encryption and decryption engine combines the data drive key with the read command information to decrypt the encrypted read data to generate decrypted read data, and transmits the decrypted read data to the storage host controller to respond to the read command.

In an exemplary embodiment, the write command information includes a logical address and a sector count indicated by the write command, and the read command information includes a logical address and a sector count indicated by the read command. The encryption and decryption engine encrypts and decrypts data according to logical addresses, to encrypt and decrypt data in units of sectors.

In an exemplary embodiment, the data drive key is provided by a data drive key provider which is the hardware of a trusted platform module. The encryption and decryption engine communicates with the data drive key provider in accordance with a key exchange protocol to safely get the data drive key. In another exemplary embodiment, the encryption and decryption engine and the data drive key provider are packed in one package to protect the data drive key from exposure. In another exemplary embodiment, the encryption and decryption engine and the data drive key provider are fabricated on a single chip to protect the data drive key from exposure.

In an exemplary embodiment of the disclosure, the storage host controller and the encryption and decryption engine are implemented in a storage host controller and equipped at a host side.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
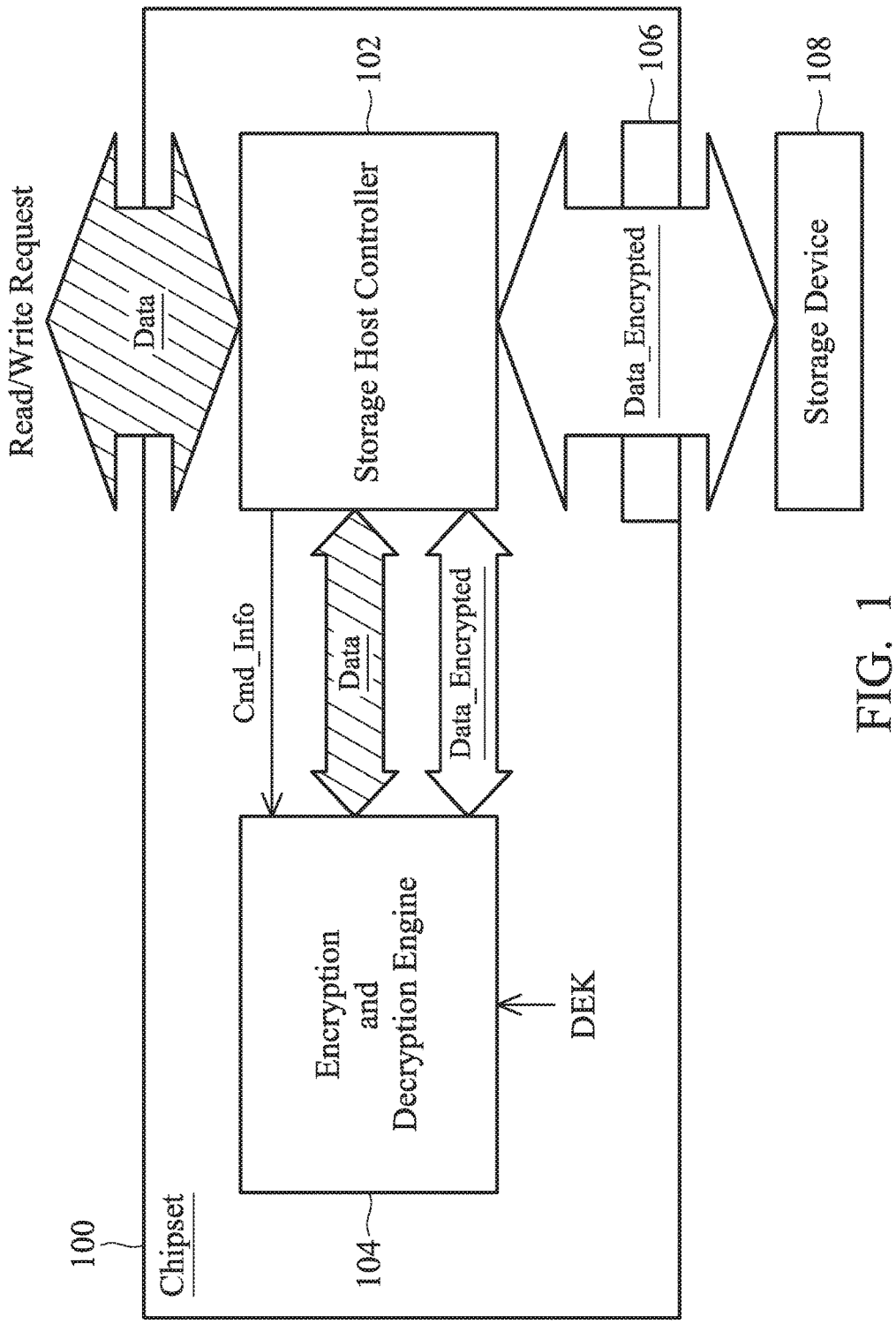
FIG. 1 is a chipset 100 in accordance with an exemplary embodiment of the disclosure.

FIG. 1 is a chipset 100 in accordance with an exemplary embodiment of the disclosure. The chipset 100 includes a storage host controller 102 and an encryption and decryption engine 104. The storage host controller 102 controls the communication between a connection port 106 and the storage device 108. The connection port 106 may be a serial advanced technology attachment (SATA) port or a universal serial bus (USB) port. The storage device 108 is a data drive, which may be a mechanical hard disk drive or a solid state drive (SSD) and so on. The encryption and decryption engine 104 is hardware and is coupled to the storage host controller 102 to encrypt or decrypt the data written into or read from the storage device 108. Because the encryption and decryption engine 104 is hardware packed in the chipset 100, the data security is considerably improved. In another exemplary embodiment, the encryption and decryption engine 104 performs data encryption and decryption without using any external storage space outside the chipset 100 for temporary storage. In an exemplary embodiment with a northbridge and a southbridge in the chipset 100, the storage host controller 102 and the encryption and decryption engine 104 are fabricated in the southbridge. In another exemplary embodiment, the encryption and decryption engine 104 is integrated into the storage host controller 102 to further improve the security of data encryption and decryption. The storage host controller 102 may analyze the received write/read command to extract write/read command information Cmd_Info therefrom. In an exemplary embodiment, the write/read command is a DMA (direct memory access) request that a DMA controller (not shown) of a host sends to the chipset 100.

The encryption and decryption engine 104 takes the write/read command information Cmd_Info into consideration during data encryption/decryption. Thus, it is more difficult to crash the data encryption and decryption.

In this paragraph, processes for write commands are discussed. The storage host controller 102 obtains write command information Cmd_Info from the received write command, and transmits the write data Data and the write command information Cmd_Info to the encryption and decryption engine 104. The encryption and decryption engine 104 combines a data drive key DEK into the write command information Cmd_Info to encrypt the write data Data and then provides the encrypted write data Data_Encrypted to the storage host controller 102 to be written into the storage device 108 via the connection port 106.

In this paragraph, processes for read commands are discussed. The storage host controller 102 obtains read command information (also referred to as Cmd_Info) from the received read command, and transmits the encrypted read data (also referred to as Data_Encrypted) and the read command information Cmd_Info to the encryption and decryption engine 104. The encryption and decryption engine 104 combines the data drive key DEK into the read command information Cmd_Info to decrypt the encrypted read data Data_Encrypted and then returns the decrypted read data (also referred to as Data) to the storage host controller 102 to respond to the read command.

The data accessed by DMA requests is transmitted in units of data blocks according to a relatively fixed transmission format, which helps the encryption and decryption engine 104 to automatically perform data encryption and decryption without using software. A write/read command of the DMA requests indicates a logical address (e.g., LBA) and a sector count to be accessed. In an exemplary embodiment, the encryption and decryption engine 104 performs data encryption and decryption in units of sectors according to the sector number obtained from the logical address (e.g. LBA) indicated by the write/read command. The data encryption and decryption is, for example, XTS-AES or SM4. The write/read command information Cmd_Info includes the logical address and the sector count indicated by the corresponding write/read command.

Figure 2A:
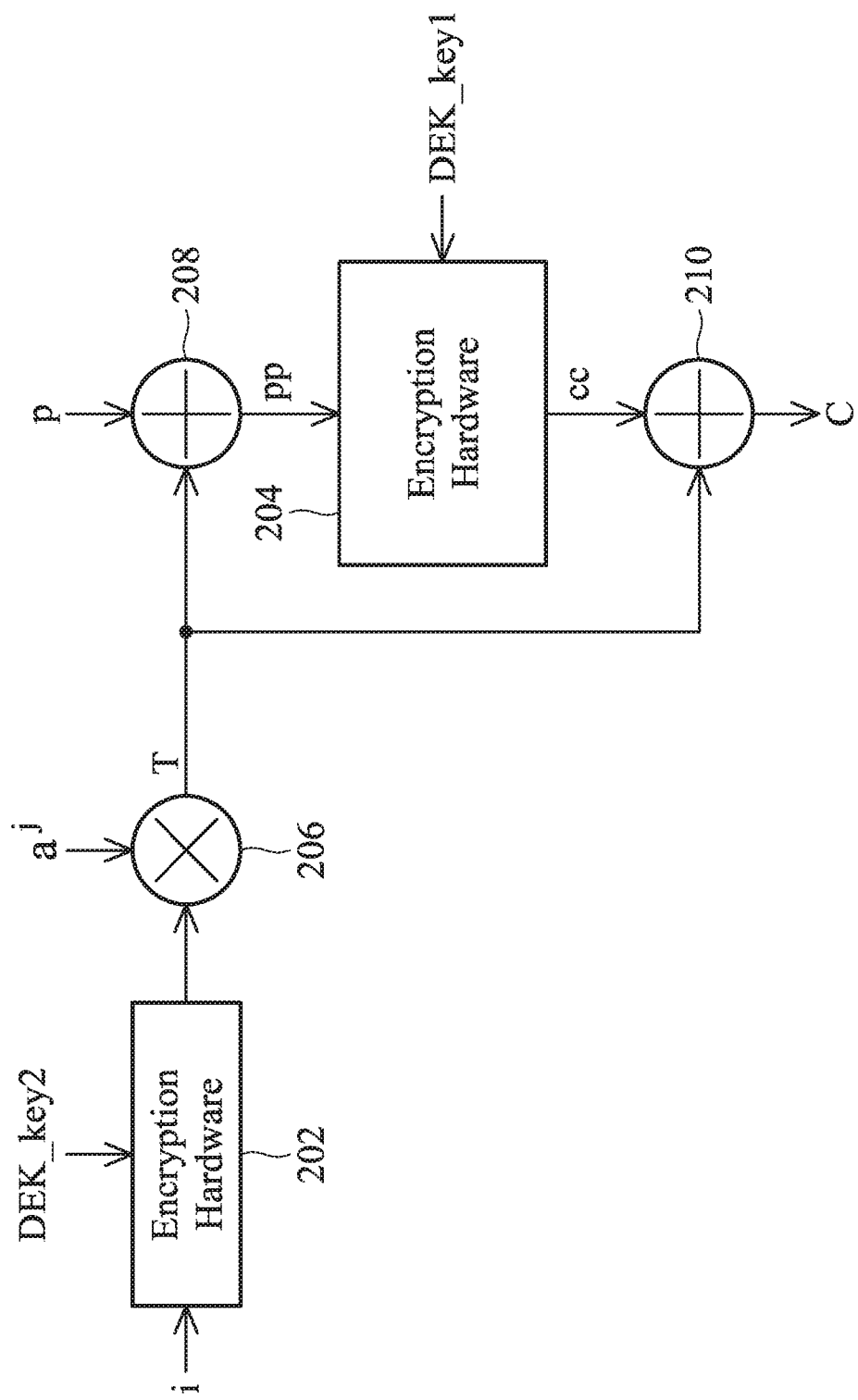
FIG. 2A depicts a XTS-AES data encryption technology.

FIG. 2A depicts a XTS-AES data encryption technology. The write command information Cmd_Info includes a data drive sector number, i, indicated by the write command. The data drive key DEK includes two key sectors DEK_key1 and DEK_key2. The data drive sector number i is combined with the key sector DEK_key2 by the encryption hardware 202 and then combined with a constant $a^j$ by a modular multiplier 206. The result T of modular multiplication is added with unencrypted write data p (which is plain text, labeled as "Data" in FIG. 1). The result pp of modular addition is combined with the key sector DEK_key1 by the encryption hardware 204 and thereby data cc is generated to be combined with the result T of modular multiplication by the modular adder 210. As shown, encrypted write data C (i.e. cypher text, labeled as "Data_Encrypted" in FIG. 1) is generated. The XTS-AES data encryption technology of FIG. 2A is not intended to limit the scope of the disclosure and may be replaced by other encryption algorithms.

Figure 2B:
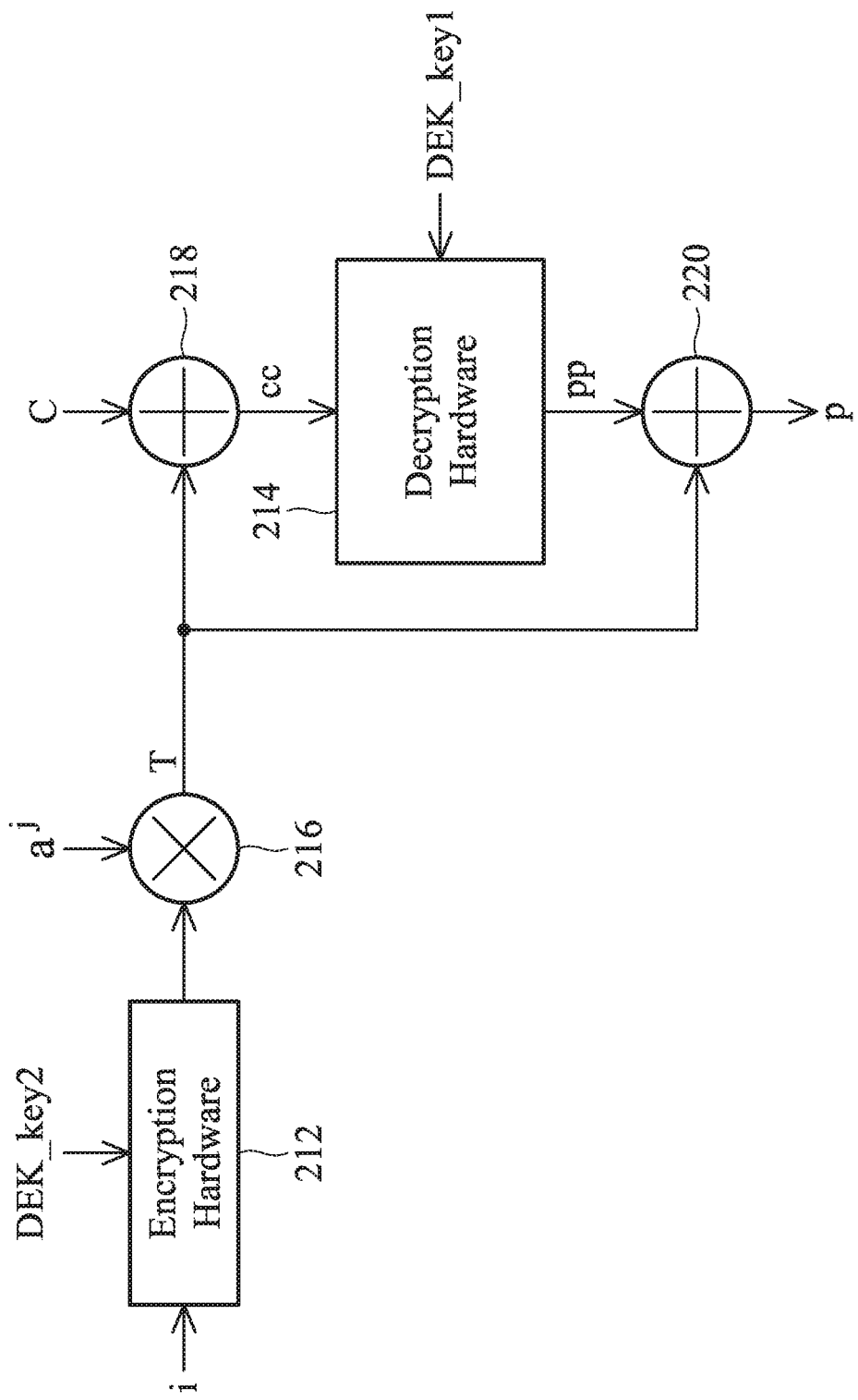
FIG. 2B depicts a XTS-AES data decryption technology.

FIG. 2B depicts a XTS-AES data decryption technology. The read command information Cmd_Info includes the data drive sector number, i, indicated by the read command. The data drive key DEK includes two key sectors DEK_key1 and DEK_key2. The data drive sector number i is combined with the key sector DEK_key2 by the encryption hardware 212 and then combined with a constant $a^j$ by the modular multiplier 216. The result T of modular multiplication is added with the encrypted read data C (i.e. cypher text, labeled as "Data_Encrypted" in FIG. 1). The result cc of modular addition is combined with the key sector DEK_key1 by the decryption hardware 214 and thereby data pp is generated to be combined with the result T of modular multiplication by the modular adder 220. As shown, decrypted read data p (which is plain text, labeled as "Data" in FIG. 1) is generated. The XTS-AES data decryption technology of FIG. 2B is not intended to limit the scope of the disclosure and may be replaced by other decryption algorithms.

Note that the data drive sector number, i, is combined into the data drive key DEK to encrypt the write data Data. Thus, according to DMA requests accessing data in units of blocks (e.g., blocks are sectors), the different accessed data blocks are encrypted and decrypted independently. As shown in FIG. 2A and FIG. 2B, for the same data with the different sector numbers, the encrypted results are different and it is difficult to crash the encrypted data. Because the data encryptions of different sectors are independent from each other, the encrypted data of each sector is accessed and decrypted independently.

In an exemplary embodiment, two options, XTS-AES and XTS-SM4, for data encryption and decryption are selected by setting a register bit. The hardware architecture for the data encryption and decryption algorithm XTS-SM4 algorithm is similar to that shown in FIG. 2A and FIG. 2B. The data encryption and decryption algorithm XTS-AES may be enabled or disabled by an "effuse" bit, for compliance with government regulations.

Figure 3:
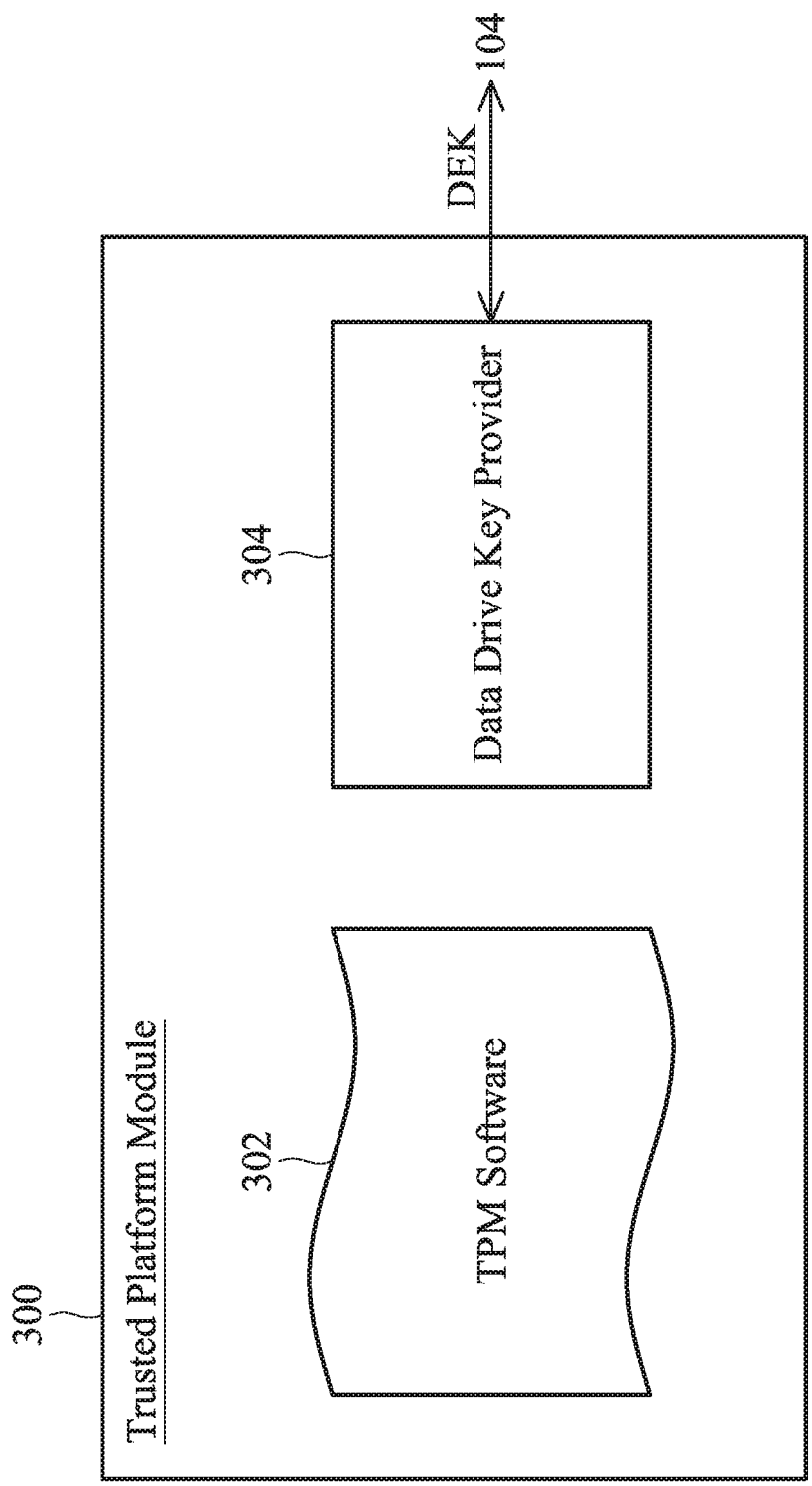
FIG. 3 is a block diagram about a trusted platform module (abbreviated to TPM) 300.

The data drive key DEK is discussed in this paragraph. FIG. 3 is a block diagram about a trusted platform module (abbreviated to TPM) 300, which includes TPM software 302 and hardware of a data drive key provider 304. The data drive key provider 304 is coupled to the encryption and decryption engine 104 to provide the encryption and decryption engine 104 with the data drive key DEK. The TPM 300 may operate the TPM software 302 through a unified extensible firmware interface (UEFI) or an operating system (OS), to further operate the data drive key provider 304 to generate the data drive key DEK.

Figure 4:
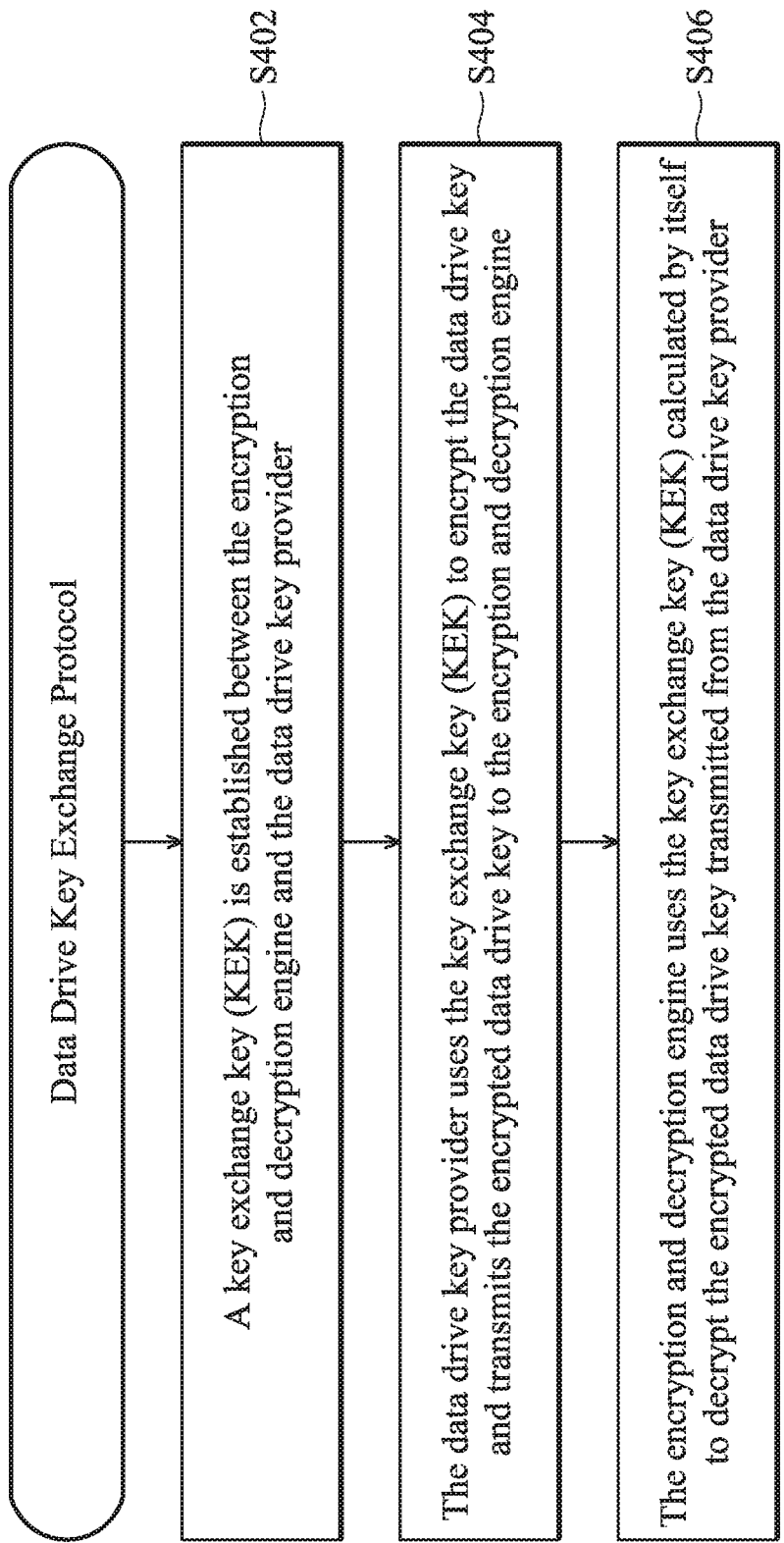
FIG. 4 is a flowchart depicting the key exchange protocol.

The communication safety between the data drive key provider 304 and the encryption and decryption engine 104 is discussed in this paragraph. In an exemplary embodiment, the encryption and decryption engine 104 is operated according to a key exchange protocol (e.g. a Diffie-Hellman key exchange protocol) to communicate with the data drive key provider 304. FIG. 4 is a flowchart depicting the key exchange protocol. In step S402, the encryption and decryption engine 104 and the data drive key provider 304 establish a key exchange key (abbreviated as KEK). In step S404, the data drive key provider 304 uses the KEK to encrypt the data drive key DEK and transmits the encrypted data drive key DEK to the encryption and decryption engine 104. In step S406, the encryption and decryption engine 104 uses the KEK calculated by itself to decrypt the encrypted data drive key DEK transmitted from the data drive key provider 304. The encryption and decryption engine 104, therefore, safely gets the data drive key DEK from the data drive key provider 304 in accordance with the steps of the flowchart.

The secure communication between the data drive key provider 304 and the encryption and decryption engine 104 may be achieved by hardware architecture. In an exemplary embodiment, the encryption and decryption engine 104 and the data drive key provider 304 are packed together into a single package. In an exemplary embodiment, the encryption and decryption engine 104 and the data drive key provider 304 are fabricated on a single chip. In an exemplary embodiment with a northbridge and a southbridge within the chipset 100, the storage host controller 102, the encryption and decryption engine 104 and the data drive key provider 304 may be fabricated inside the southbridge. The isolated communication environment for the key transmission does not expose the data drive key DEK to the external data bus or external connection port. Thus, it is safe to communicate between the data drive key provider 304 and the encryption and decryption engine 104 in plain text (unencrypted).

In an exemplary embodiment, a data drive key (DEK) request transmitted from the encryption and decryption engine 104 to the data drive key provider 304 is accepted by the data drive key provider 304 only when the user-preset conditions are satisfied. The user may use a password, a smart card, fingerprint, remote attestation, user identity, or a system status to check the DEK request transmitted from the encryption and decryption engine 104 to the data drive key provider 304. Furthermore, the user-preset conditions may be set through the TPM software 302 which is operated by a UEFI or an OS.

In an exemplary embodiment, the TPM 300 further uses key migration to make a backup of the data drive key DEK.

In this paragraph, the storage device 108 is a serial advanced technology attachment (SATA) device, and how the chipset 100 encrypts and decrypts the storage device 108 is shown. The SATA data drive (e.g. 108) may be a mechanical hard disk drive or a solid state drive (SSD). The chipset 100 may perform a full disk encryption on the SATA data drive 108 or just perform a partial disk encryption according to logical addresses (e.g. LBA). The chipset 100 may be set to the full or partial disk encryption through a basic input and output system (BIOS). The encryption and decryption engine 104 may operate according to the XTS-AES or XTS-SM4 encryption algorithm, in which the logical address LBA (e.g., the data drive sector number, i, of FIG. 2A and FIG. 2B) is taken as the tweak. The sector size of a data drive may be 512 bytes or 4K bytes.

Figure 5A:
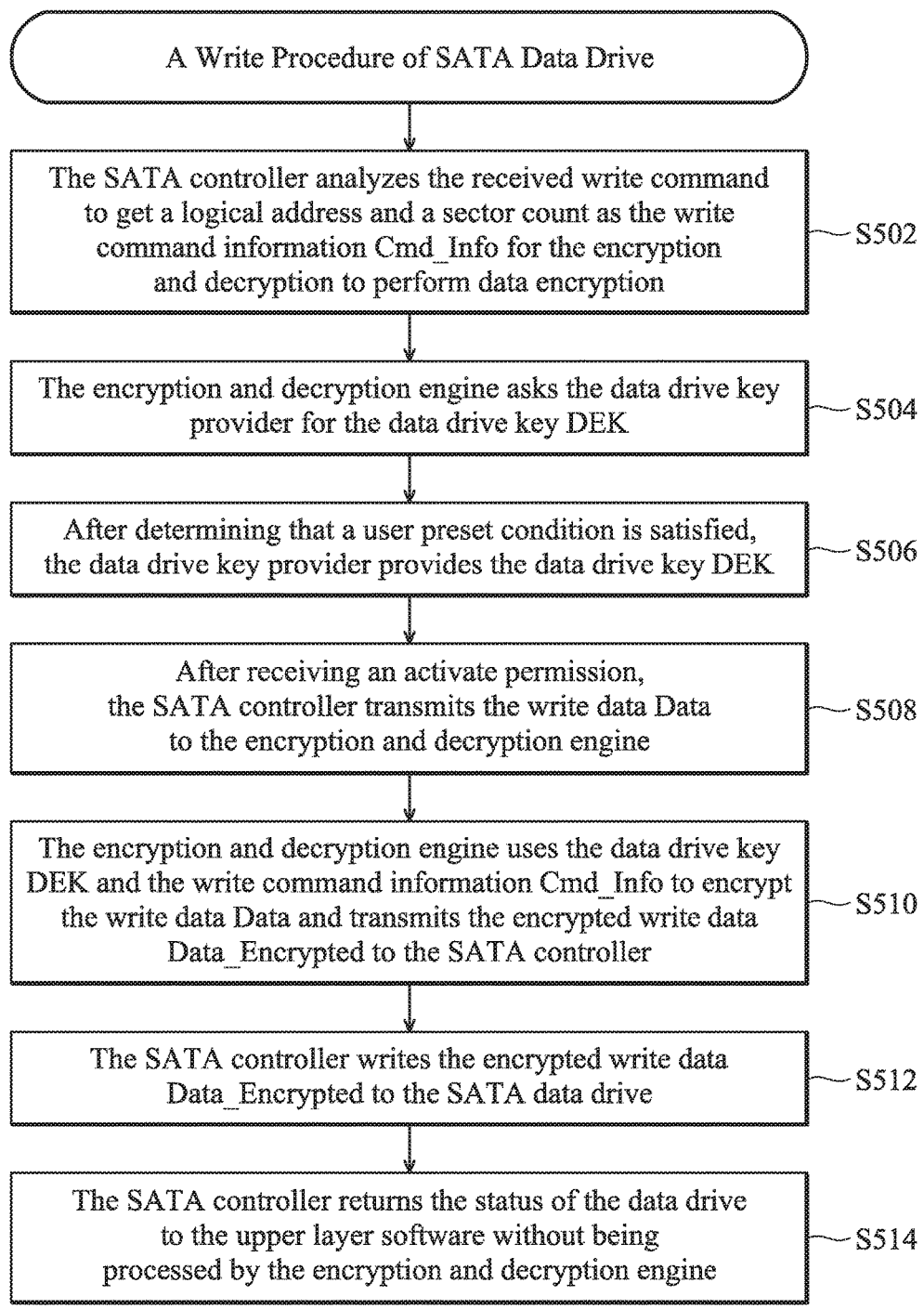
FIG. 5A is a flowchart depicting a write procedure of a SATA data drive.

FIG. 5A is a flowchart depicting a write procedure of a SATA data drive. In step S502, the SATA controller (e.g. 102) receives and analyzes a write command (e.g. WRITE DMA EXT) to get the write command information Cmd_Info including a logical address (e.g. LBA) and a sector count, and provides the write command information Cmd_Info to the encryption and decryption engine 104 to perform data encryption. In step S504, the encryption and decryption engine 104 asks the data drive key provider 304 for a data drive key DEK. In step S506, after determining that a user-preset condition is satisfied, the data drive key provider 304 provides the data drive key DEK to the encryption and decryption engine 104. In step S508, the SATA controller 102 transmits the unencrypted write data Data to the encryption and decryption engine 104 after receiving the activate permission (e.g. a DMA Active Frame Information Structure, abbreviated as a DMA Active FIS). In an exemplary embodiment, the unencrypted write data is transmitted to the encryption and decryption engine 104 in units called DATA FISs, each DATA FIS may include multiple sectors, and one DMA request may include more than one DATA FISs. That is, the encryption and decryption engine 104 receives the unencrypted write data Data, for example, in unit of DATA FIS from the SATA controller 102. In step S510, the encryption and decryption engine 104 uses the data drive key DEK and the write command information Cmd_Info to encrypt the unencrypted write data Data, and transmits the encrypted write data Data_Encrypted to the SATA controller 102. The encryption and decryption engine 104 may continuously encrypt the next unit of data (e.g. the next DATA FIS) until data is no longer received from the SATA controller 102. In step S512, the SATA controller 102 writes the encrypted write data Data_Encrypted to the SATA data drive 108. In step S514, a status transmission is performed, by which the subsequent status of the data drive is returned to the upper layer software by the SATA controller 102 without being processed by the encryption and decryption engine 104. In an exemplary embodiment, the SATA controller 102 and the encryption and decryption engine 104 repeat steps S508 to S514 until the encryption of all DATA FISs indicated by the received write command are finished.

Figure 5B:
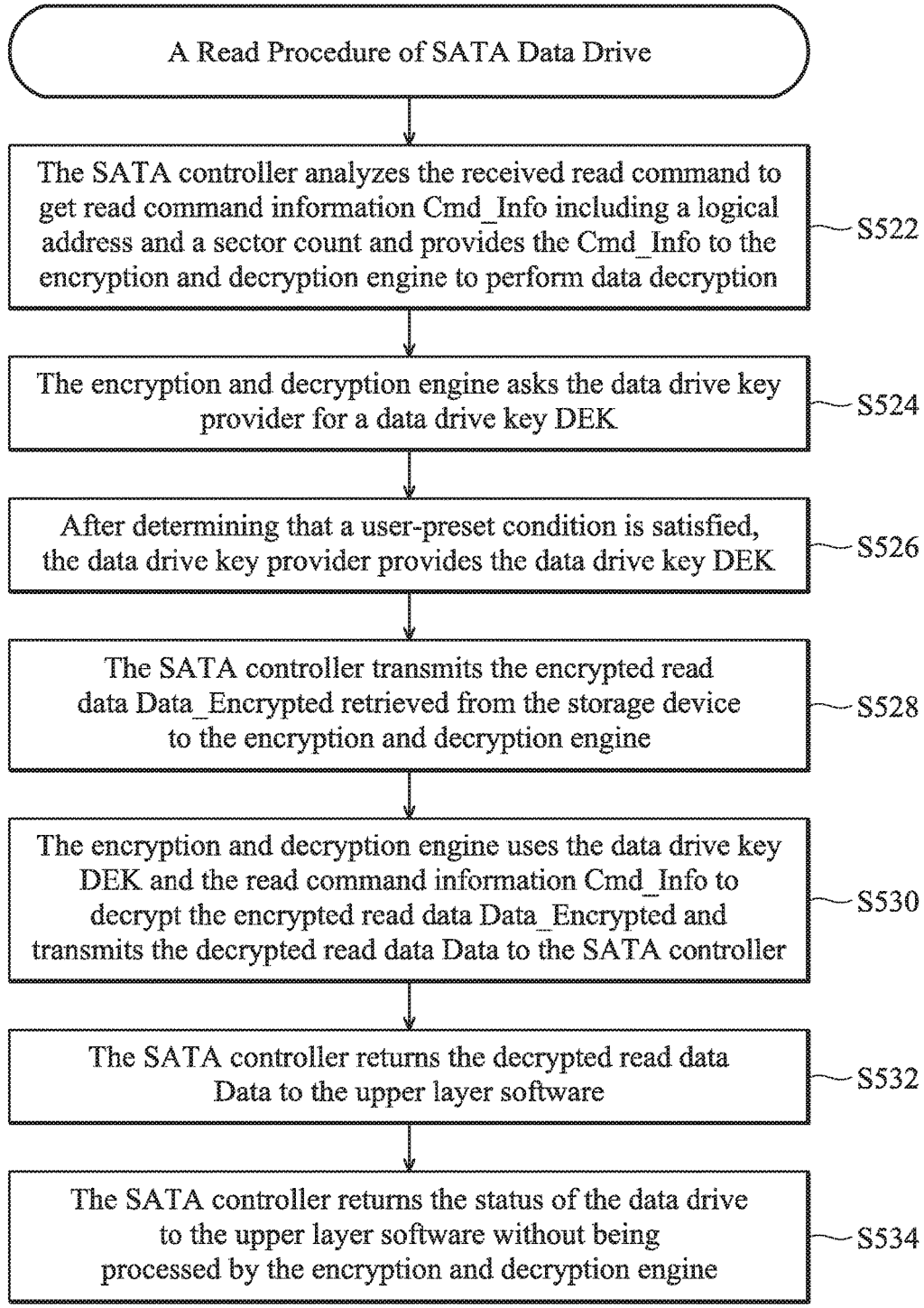
FIG. 5B is a flowchart for a read procedure of a SATA data drive.

FIG. 5B is a flowchart for a read procedure of a SATA data drive. In step S522, the SATA controller 102 receives and analyzes the read command to get read command information Cmd_Info that includes a logical address (e.g. LBA) and a sector count and provides the read command information Cmd_Info to the encryption and decryption engine 104 to perform data decryption. In step S524, the encryption and decryption engine 104 asks the data drive key provider 304 for the data drive key DEK. In step S526, after determining that a user-preset condition is satisfied, the data drive key provider 304 provides the data drive key DEK to the encryption and decryption engine 104. In step S528, the SATA controller 102 transmits the encrypted read data Data_Encrypted retrieved from the SATA data drive 108 to the encryption and decryption engine 104, for example, transmits the encrypted read data Data_Encrypted in units called DATA FISs. The encryption and decryption engine 104 receives the encrypted read data Data_Encrypted from the SATA controller 102, for example, in units of DATA FISs. In step S530, the encryption and decryption engine 104 decrypts the encrypted read data Data_Encrypted in accordance with the data drive key DEK and the read command information Cmd_Info, and transmits the decrypted read data Data to the SATA controller 102. The encryption and decryption engine 104 may continuously decrypt the next DATA FIS until data is no longer received from the SATA controller 102. In step S532, the SATA controller 102 returns the decrypted read data Data to the upper layer software. In step S534, a status transmission is performed, by which the subsequent status of the data drive is returned to the upper layer software without being processed by the encryption and decryption engine 104. In an exemplary embodiment, the SATA controller 102 and the encryption and decryption engine 104 repeat steps S528 to S534 until the decryption of all Data FISs indicated by the received read command are finished.

The SATA transmission may be further used in a DMA technique with a native command queue (abbreviated as NCQ).

Figure 6A:
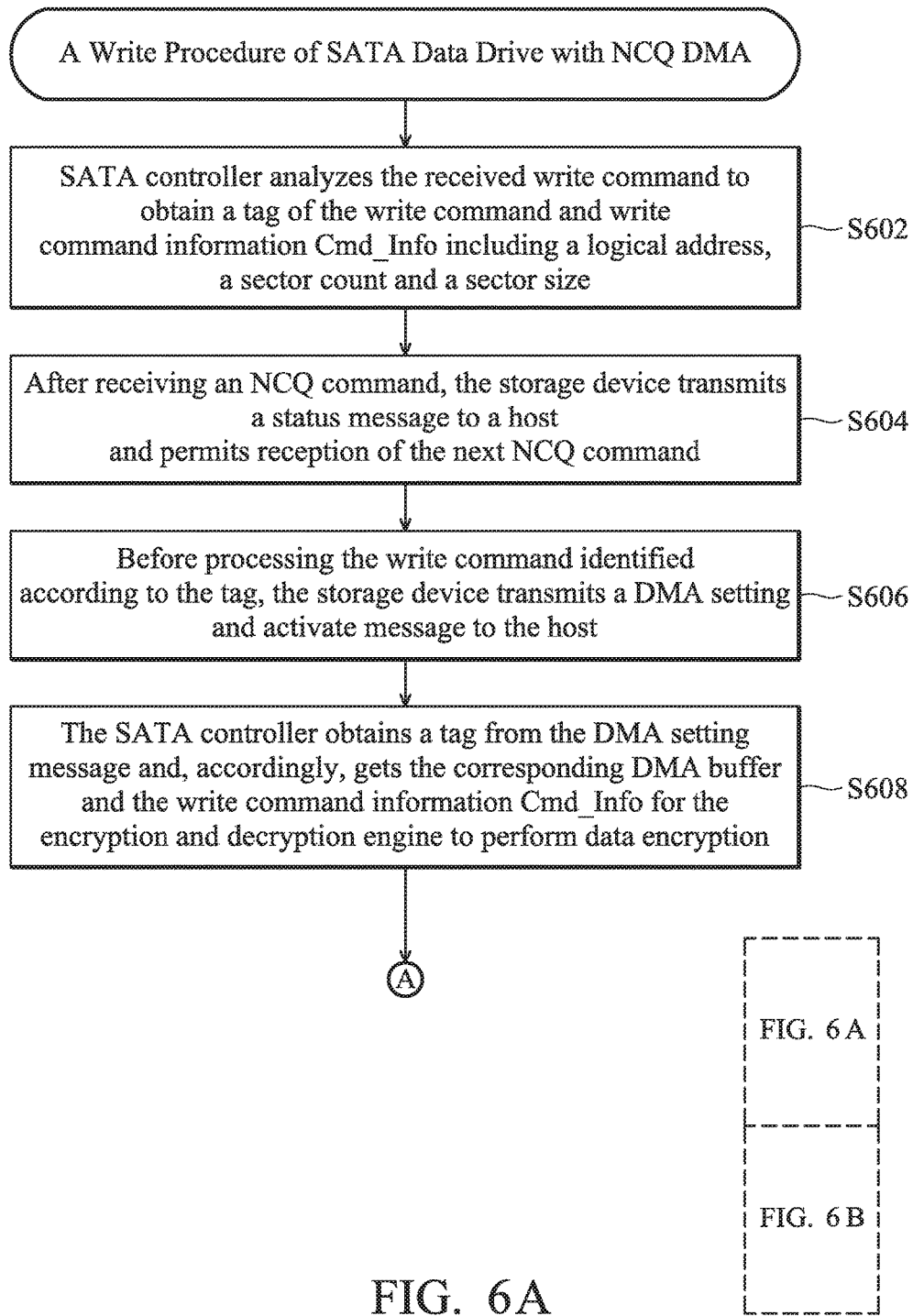
FIG. 6A and FIG. 6B show a flowchart depicting a write procedure for a SATA data drive operated by direct memory access (DMA) using a native command queue (NCQ)
Figure 6B:
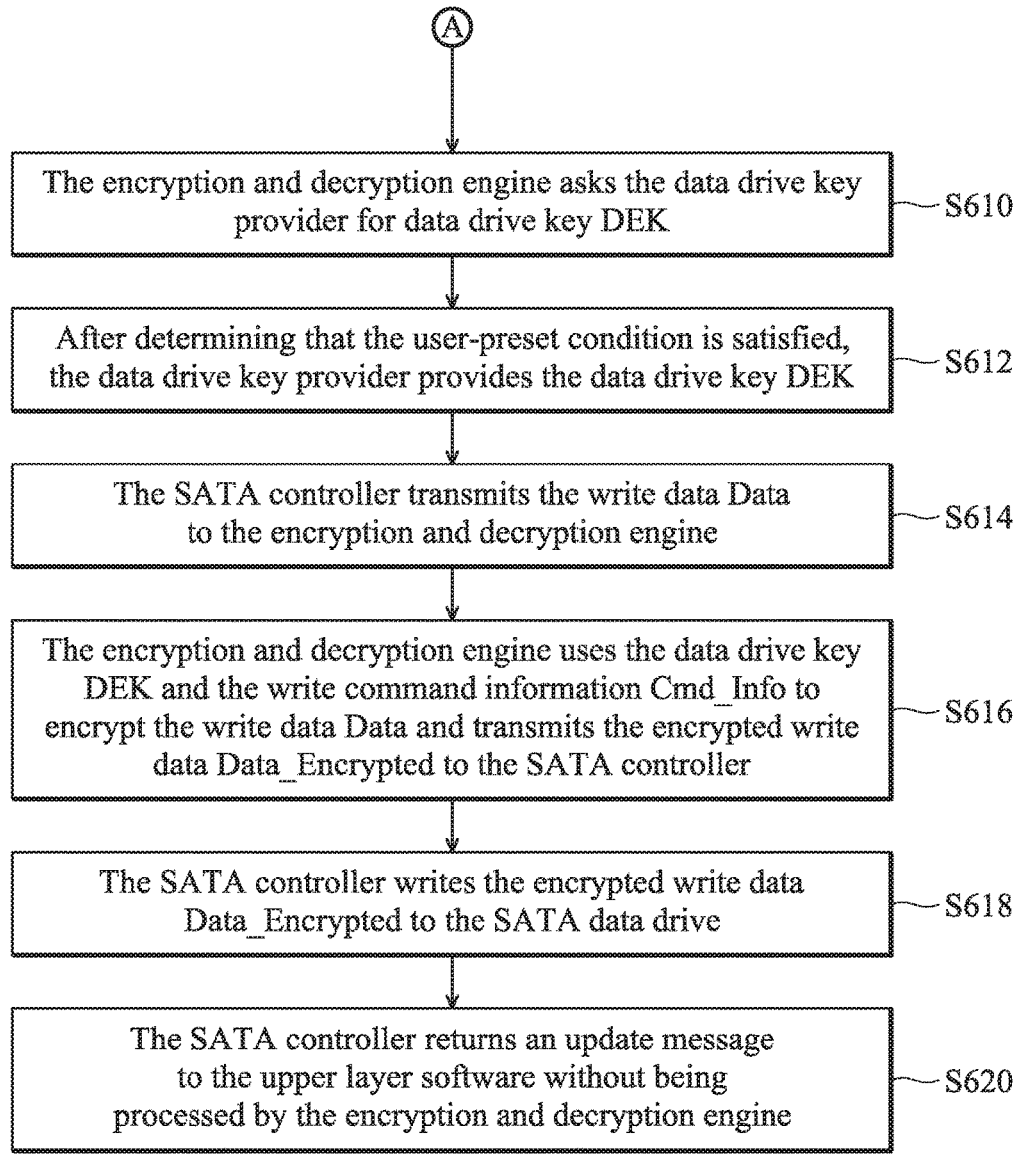

FIG. 6A and FIG. 6B show a flowchart depicting a write procedure for a SATA data drive operated by direct memory access (DMA) using a native command queue (NCQ). In step S602, the SATA controller 102 receives and analyzes a write command (e.g. WRITE FPDMA QUEUED) to obtain a tag (to distinguish several NCQ write or read commands from each other) and the write command information Cmd_Info including a logical address (LBA), a sector count and a sector size. In step S604, after receiving an NCQ command, the SATA data drive 108 outputs a status signal, Register D2H FIS, to allow reception of the next NCQ command. The SATA data drive 108 may be switched to respond to other tasks with higher priority or the former NCQ commands. In step S606, before processing the command identified by a tag, the SATA data drive 108 transmits a DMA setup FIS and a DMA ACTIVE FIS to a host. In step S608, the SATA controller 102 analyzes a tag from the DMA setup FIS and gets and provides the corresponding DMA buffer and the write command information Cmd_Info to the encryption and decryption engine 104 to perform data encryption. In step S610, the encryption and decryption engine 104 asks the data drive key provider 304 for the data drive key DEK. In step S612, after determining that a user-preset condition is satisfied, the data drive key provider 304 provides the data drive key DEK to the encryption and decryption engine 104. In step S614, the SATA controller 102 transmits the unencrypted write data DATA to the encryption and decryption engine 104 (e.g., transmits the unencrypted write data DATA in units called DATA FISs with each DATA FIS including multiple sectors and each DMA request writing multiple DATA FISs). The encryption and decryption engine 104 receives the unencrypted write data DATA (e.g. receives the unencrypted write data DATA in units called DATA FISs) from the SATA controller 102. In step S616, the encryption and decryption engine 104 uses the data drive key DEK and the write command information Cmd_Info to encrypt the unencrypted write data DATA and thereby generates and transmits the encrypted write data Data_Encrypted to the SATA controller 102. The encryption and decryption engine 104 may continuously encrypt the next data until data is no longer received from the SATA controller 102. In step S618, the SATA controller 102 writes the encrypted write data Data_Encrypted to the SATA data drive 108. In step S620, the SATA data drive 108 transmits an update message (i.e. a SET Device Bit FIS) to the host and updates an SAtive register and the status of the host. The update message is returned to the upper layer software by the SATA controller 102 without being processed by the encryption and decryption engine 104. The SATA data drive read procedure according to the NCQ DMA is operated based on a similar concept to safely receive the data drive key DEK and decrypt the encrypted read data Data_Encrypted (that the SATA controller 102 receives from the SATA data drive 108) within the encryption and decryption engine 104. In an exemplary embodiment, the SATA controller 102 and the encryption and decryption engine 104 repeat steps S614 to S620 utile the encryption of all DATA FISs indicated by the received write command is finished.

This paragraph shows how the chipset 100 encrypts and decrypts a USB data drive (i.e. 108). The chipset 100 may perform full disk encryption or just partial disk encryption (in a particular logical address (LBA) range) on the USB data drive 108 according to how the BIOS sets the chipset 100. Through the BIOS, the chipset 100 may be further set to enable or disable the encryption of the storage device connected to a particular USB connection port. The USB controller (e.g. 102 of FIG. 1) controls the USB connection port (e.g. 106 of FIG. 1) and the USB data drive 108 to communicate in accordance with a Bulk-Only Transport (BOT) protocol for USB 2.0 or an USB Attached SCSI (UAS) protocol and any USB protocol transmitting data in units of data blocks.

Figure 7:
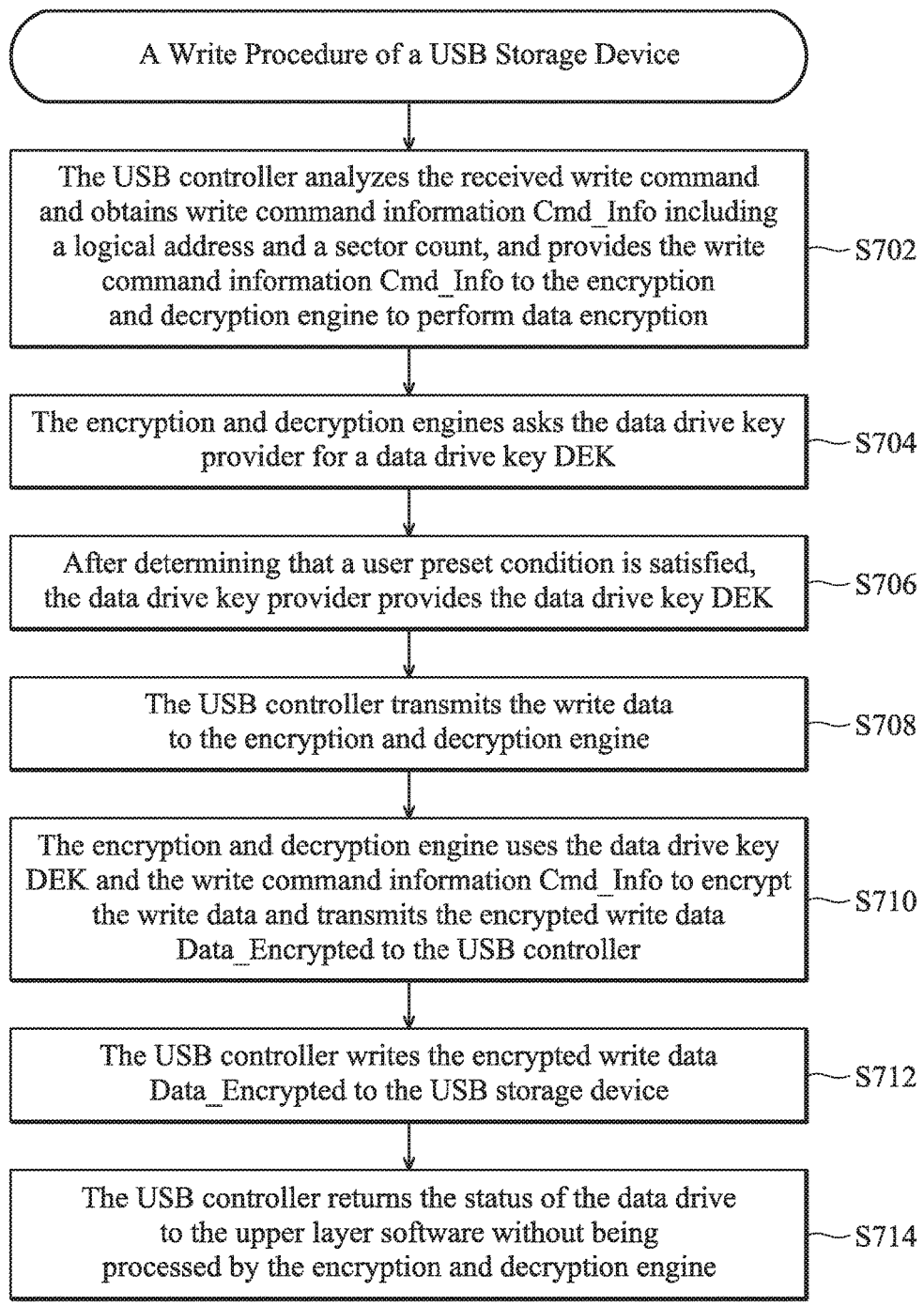
FIG. 7 is a flowchart for a write procedure of a USB data drive.

FIG. 7 is a flowchart for a write procedure of a USB data drive. In step S702, the USB controller 102 receives and analyzes a write command (e.g. write(10)) to obtain write command information Cmd_Info including a logical address (e.g. LBA) and a sector count and provides the write command information Cmd_Info to the encryption and decryption engine 104 to perform data encryption. In step S704, the encryption and decryption engine 104 asks the data drive key provider 304 for the data drive key DEK. In step S706, after determining that the user-preset condition is satisfied, the data drive key provider 304 provides the data drive key DEK. In step S708, the USB controller 102 transmits the unencrypted write data Data (e.g. transmits the unencrypted write data Data in units called data packages) to the encryption and decryption engine 104. In step S710, the encryption and decryption engine 104 uses the data drive key DEK and the write command information Cmd_Info to encrypt the unencrypted write data Data and transmits the encrypted write data Data_Encrypted to the USB controller 102. The encryption and decryption engine 104 may continuously encrypt the next write data until data is no longer received from the USB controller 102. In step S712, the USB controller 102 writes the encrypted write data Data_Encrypted to the USB data drive 108. In step S714, a status transmission is performed and thereby the subsequent status of the data drive is returned to the upper layer software by the USB controller 102 without being processed by the encryption and decryption engine 104. The read procedure of the USB data drive is operated according to a similar concept to safely get the data drive key DEK and decrypt the encrypted read data Data_Encrypted that the USB controller 102 retrieves from the USB data drive 108. In an exemplary embodiment, the USB controller 102 and the encryption and decryption engine 104 repeat steps S708 to S714 until the encryption of all data packages indicated by the received write command are finished.

In an exemplary embodiment, the storage host controller 102 and the encryption and decryption engine 104 of the disclosure are implemented within a host controller at the host side.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A chipset, comprising:
a storage host controller, controlling the communication between a connection port and a storage device;
an encryption and decryption engine, hardware coupled to the storage host controller,
wherein:
the storage host controller receives and analyzes a write command to obtain write command information and transmits write data and the write command information to the encryption and decryption engine;
the encryption and decryption engine combines a data drive key with the write command information to encrypt the write data and transmits the encrypted write data to the storage host controller to be written into the storage device via the connection port;

the data drive key is provided by a data drive key provider which is hardware of a trusted platform module;

the encryption and decryption engine communicates with the data drive key provider in accordance with a key exchange protocol to get the data drive key from the data drive key provider; and the storage host controller transmits the write data to the encryption and decryption engine after receiving an activation permission defined in direct memory access.

2. The chipset as claimed in claim 1, wherein:
the storage host controller further receives and analyzes a read command to obtain read command information, and transmits encrypted read data retrieved from the storage device and the read command information to the encryption and decryption engine; and
the encryption and decryption engine combines the data drive key with the read command information to decrypt the encrypted read data to generate decrypted read data, and transmits the decrypted read data to the storage host controller to respond to the read command.

3. The chipset as claimed in claim 2, wherein:
the write command information includes a logical address and a sector count indicated by the write command; and
the read command information includes a logical address and a sector count indicated by the read command.

4. The chipset as claimed in claim 3, wherein:
according to the logical address, the encryption and decryption engine encrypts the write data or decrypts the encrypted read data in units of sectors.

5. The chipset as claimed in claim 1, wherein:
the trusted platform module operates the data drive key provider through a unified extensible firmware interface or an operating system.

6. The chipset as claimed in claim 1, wherein:
the encryption and decryption engine and the data drive key provider are packed in one package or fabricated on a single chip.

7. The chipset as claimed in claim 1, wherein:
a data drive key request that the encryption and decryption engine transmits to the data drive key provider is accepted by the data drive key provider when the data drive key provider determines that a user-preset condition is satisfied.

8. The chipset as claimed in claim 1, wherein:
the data drive key is encrypted and backup by the trusted platform module.

9. The chipset as claimed in claim 1, wherein:
the chipset is set by a basic input and output system to perform partial encryption on the storage device to encrypt write data at particular logical addresses.

10. The chipset as claimed in claim 1, wherein:
the storage host controller further obtains tags from multiple write commands in a native command queue, wherein the write commands in the native command queue are distinguished from each other according the tags thereof;
the storage host controller transmits the write command information of a corresponding one of the multiple write commands to the encryption and decryption engine based on a corresponding one of the tags set by the storage device; and
the write command information of the multiple write commands further includes sector size of the multiple write commands.

11. The chipset as claimed in claim 1, wherein:
the storage host controller is a host controller of a universal serial bus connection port; and
the chipset is set by a basic input and output system to enable or disable data encryption of the storage device connected to the universal serial bus connection port.

12. The chipset as claimed in claim 11, wherein:
the storage host controller controls the connection port and the storage device to communicate according to a Bulk-Only Transport (BOT) protocol.

13. The chipset as claimed in claim 11, wherein:
the storage host controller controls the connection port and the storage device to communicate according to a USB Attached SCSI (UAS) protocol.

14. The chipset as claimed in claim 1, further comprising a southbridge with the storage host controller and the encryption and decryption engine fabricated in the southbridge.

15. The chipset as claimed in claim 1, further comprising a southbridge with the storage host controller and the encryption and decryption engine and the data drive key provider fabricated in the southbridge.

16. The chipset as claimed in claim 1, wherein:
the write command is a direct memory access request transmitted from a host to the chipset.

17. A host controller, comprising:
a storage host controller, controlling the communication between a connection port and a storage device;
an encryption and decryption engine, hardware coupled to the storage host controller,
wherein:
the storage host controller receives and analyzes a write command to obtain write command information and transmits write data and the write command information to the encryption and decryption engine;
the encryption and decryption engine combines a data drive key with the write command information to encrypt the write data and transmits the encrypted write data to the storage host controller to be written into the storage device via the connection port;
the data drive key is provided by a data drive key provider which is hardware of a trusted platform module;
the encryption and decryption engine communicates with the data drive key provider in accordance with a key exchange protocol to get the data drive key from the data drive key provider; and
the storage host controller transmits the write data to the encryption and decryption engine after receiving an activation permission defined in direct memory access.

18. The chipset as claimed in claim 1, wherein the write data comprising multiple data units with different write command information.

* * * * *